Patented July 18, 1944

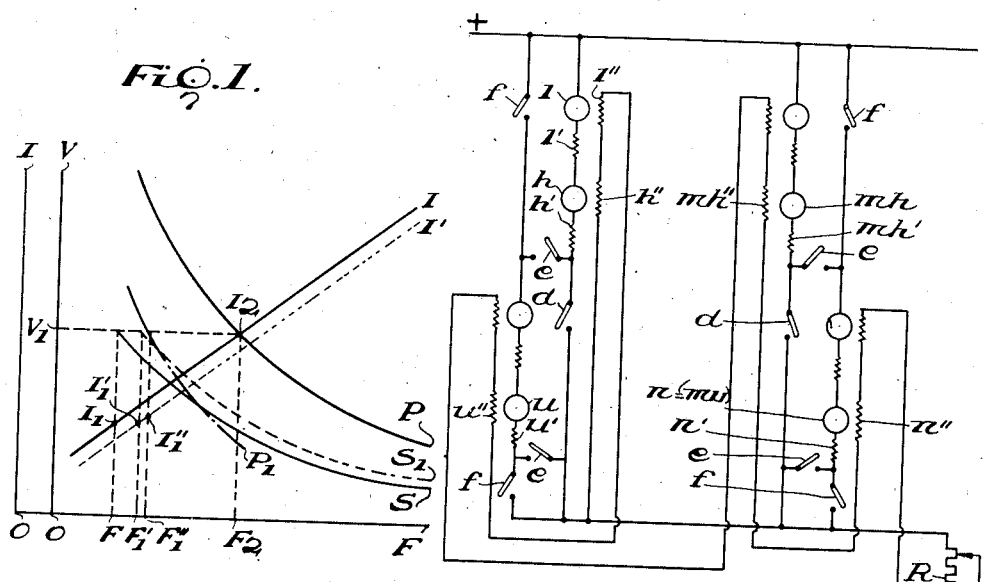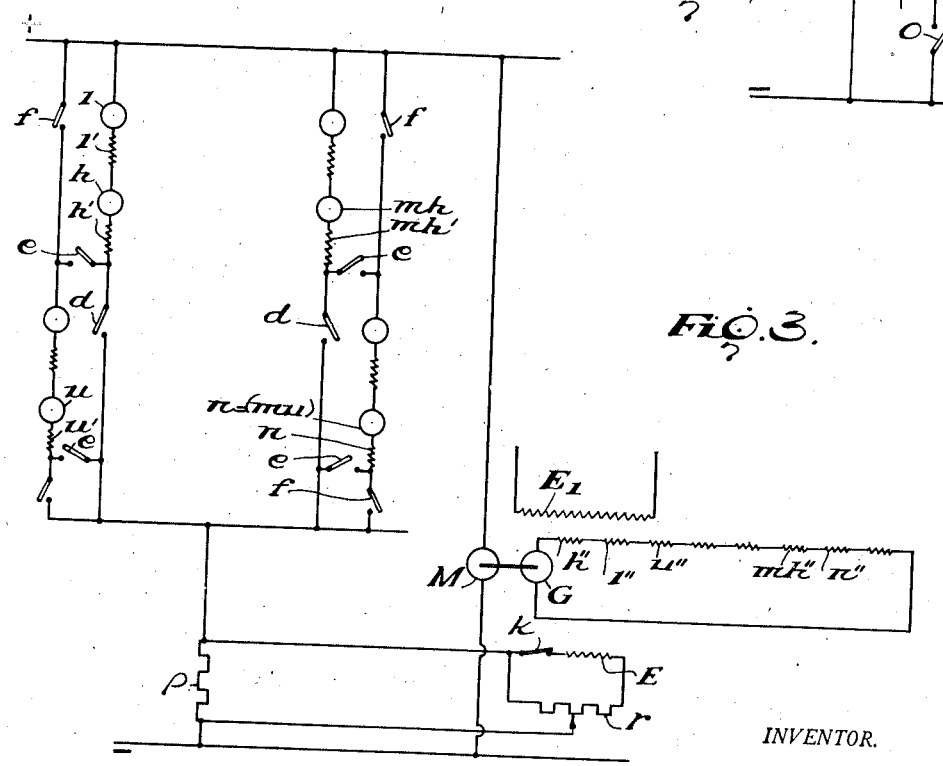

2,354,002

UNITED STATES PATENT OFFICE 2,354,002

METHOD OF TRANSITION BETWEEN COUPLINGS OF DIRECT-CURRENT MOTORS

Paul Marie Jacques Séverin de Giacomoni, Paris, France; vested in the Alien Property Custodian Application June 9, 1942, Serial No. 446,374
In France March 3, 1941

5 Claims. (Cl. 172—179)

This invention relates to a method of transition from one form of connection to another in couplings of direct current motors.

It is well known that in plants adapted for supplying mechanical energy by means of a plurality of electric motors supplied with direct current under a constant voltage and more particularly in electric locomotives and rail motor cars, one of the methods of regulation which are generally used consists in varying the voltage at the terminals of the armatures of the motors by modifying the method of coupling of the latter and by connecting them according to the requirements either in series or in series-parallel or in parallel so as to distribute the constant voltage of the mains in an adequate manner among them.

It is also known that in a general manner when passing from one connection to the next the change of voltage cannot be effected directly and that for avoiding considerable surges in the intensity of the armature current of the motors and in the torques or the corresponding traction stresses, with all the dangers involved in such jerks from the mechanical and electrical point of view, it is necessary, as regards the voltage applied to the armatures, to pass through one or more intermediate conditions insuring a progressive transition.

But all methods which have been used hitherto for effecting such a passage from one connection to another involve the use of a devolting device or negative booster (resistance, group, battery and the like) which during the transition has for its duty to absorb a material fraction of the available energy and which, therefore, must have large dimensions, so that the weight and the space required are comparatively out of proportion with the result to be obtained, owing to the rapidity with which the transition is practically effected.

It has been proposed, through certain modifications, to reduce the importance of the devolting devices in question. More particularly, it has been proposed to cause the last economical curve speed-torque of the lower connection (i. e., the connection of lower terminal voltage) to come as near as possible to the first normal economical speed-torque curve of the upper connection (i. e., the connection of higher terminal voltage) by means of shunting such as described in the British Patent No. 10,072 of 1907, for example.

However, in the present state of the art and for the usual types of motors it has not been possible hitherto by this sole means to do away entirely with resistances specifically limiting the intensity and the stress, that is to say, the so-called "transition resistances," or with the equivalent special auxiliary devices.

The present invention has for its object a method of transition which regardless of the number of motors of the coupling makes it possible to pass from one connection to the next without the use of any transition resistance or any other auxiliary transition device.

According to the invention, this result is obtained by combining a raising of the last speed-torque curve of the lower voltage connection, which raising is obtained by means of a suitable shunting, with a lowering of the first speed-torque curve of the higher voltage connection, which lowering is effected by means of a suitable temporary reinforcement of the inductor fields.

Then the necessary shunting and field reinforcement require only the use of devices which do not require much space. They can be obtained by any known means, more particularly by means of the variable resistances of the auxiliary motor-dynamo groups which are used for regulation or by suitable connections of the inductor fields themselves.

If the respective shiftings of both curves in question are judiciously chosen and performed, the lowered curve of the higher voltage connection will intersect the raised curve of the lower voltage connection at such a point that the variation of intensity of the armature currents during the change of connection will be acceptable, so that at approximately the speed corresponding to this point of intersection, the transition will be effected without any appreciable jerk.

The above described method is particularly advantageous when, according to my copending application Serial No. 436,356, filed March 26, 1942, the couplings in series-parallel or in parallel comprise an inductive chain in which either the inductor windings of the various motors or fractions thereof are connected in series.

The said chain, which can be either connected with a point common to the parallel branches or excited separately from the latter, permits an easy application of the shunting and the field reinforcement which underlie the method.

In the drawing,

Fig. 1 is a diagram illustrating the results which can be obtained with the invention as stated generally above;

Fig. 2 shows a suitable arrangement embodying the invention; and

Fig. 3 illustrates another embodiment of the invention.

In Fig. 1, S and P are the speed-torque curves of the whole of the motors for the lower voltage connection and for the higher voltage connection respectively. I is the curve of the intensities for one motor.

If a transition were made from the lower voltage connection to the higher voltage connection at the moment where the speed of the machine is equal to $V_1$, the total torque to $F_1$ and the intensity to $I_1$, then the speed remaining constant during the operation, it can be seen that if no precaution were taken the torque would pass instantaneously from the value $F_1$ to the value $F_2$, and the intensity would pass from $I_1$ to $I_2$ for each motor. From the point of view of stresses and intensities there would be, therefore, abrupt harmful changes.

The above mentioned known shunting method raises the speed-torque curve and lowers the curve of the intensities, and thus provides the curves $S_1$ and $I'$ drawn in chain lines. Under the new conditions thus achieved, the transition at the same constant speed $V_1$ from the curves S and I to the curves $S_1$ and $I'$ results in the torque $F'_1$ and the intensity $I'_1$. In the further transition to the curve P, the stress jerk would thus be reduced from $F_2-F_1$ to $F_2-F'_1$. Hitherto, however, it has not been possible without the use of transition resistances to reduce the difference $F_2-F'_1$ to an acceptable value. On the other hand, the curve $P_1$ shows the lowered position of the curve P, this new position being obtained, as already mentioned above, by a reinforcement of the fields of the motors which are now grouped in the higher voltage connection. This curve $P_1$ intersects the raised curve $S_1$ in a point near the horizontal line drawn through $V_1$, so that the torque $F''_1$ which corresponds to the constant speed $V_1$, is higher than $F'_1$ but near enough to the latter that the passage from the curve $S_1$ to the curve $P_1$ can be effected without any mechanical jerks.

Similarly the intensity for each motor has become $I''_1$ which is near $I'_1$, and hence electrical surges are not to be feared.

It is now sufficient, for attaining the normal curve P, to reduce progressively the temporary reinforcement of the fields which caused the curve P to be lowered to $P_1$.

It will readily be seen that this method is of general application and requires no transition resistances since both operations, shunting on the one hand and reinforcement of the inductor fields on the other hand, can be effected by any known means, as, for instance, by means of variable resistances or by means of auxiliary groups of small importance or through field connections. Accordingly the equipment of vehicles is made considerably lighter with respect to known systems using transition resistances or other special auxiliary devices such as those mentioned above. This improvement is still more marked when, as in the forms of execution which will be described later on, the regulation device itself serves simultaneously as shunting means and as reinforcing means for the inductor fields, It will be seen that if the series field windings of a group of motors, or fractions thereof, are connected in series with each other and with the group of motors, the current through these windings will comprise the sum of the armature currents of the motors whether they are connected in series, series-parallel, or parallel.

However, it is evident that the characteristics obtained with this connection can be identical with those obtained with the normal connection of the series-motors if the current which flows through the chain of inductors is the same as the current which flows through a single branch of the armatures, a condition which it is always possible to answer by judiciously shunting the said chain of inductors.

With the motors connected in series, the maximum shunting curve $S_1$ of such an arrangement can be obtained, for instance, by the insertion of resistances in parallel with the windings or by short-circuiting a certain number of turns of the inductor windings or by the use of a dynamo connected across the terminals of the said inductors, or by any other known means. Then if the connection of the motors is changed from series to parallel, and the shunting resistance is thrown out, the current through the field windings is greatly increased so that the normal full field curve P of the connection in parallel is considerably lowered to $P_1$ and according to the characteristics proper to each case it may be close to the shunted curve or even intersect it in a zone of admissible intensities and stresses.

It is evident that in order to take advantage of all the economical speeds offered by the connection in parallel it is now only necessary progressively to insert anew the shunting resistances which are made adjustable for this purpose.

The return to the connection in series is effected without any difficulty by making the operations in the reverse order.

As will be observed, the transition is thus effected without the insertion in the main circuit in direct connection with the armatures of considerable resistances which, in the above mentioned example, would have absorbed a material fraction (½) of the feeding voltage. Moreover, the shunting resistances which are used can be of reduced dimensions, since they are fed with a very weak voltage; on the other hand, as already mentioned, they are used not only for the transition but also for obtaining a range of economical speeds. To recapitulate in brief the method above described consists of four steps as follows:

1. Shunting the fields of the series connected series wound motor by resistance.
2. Changing the armatures to parallel while leaving the fields in series.
3. Opening the shunt.
4. Gradually inserting resistance in shunt to the fields.

It will also be evident that the field current in such an arrangement can be controlled by means other than shunting resistances. For example, if calculation shows that the curve $P_1$ which would be obtained by the summation, in the inductors, of the currents which flow through the parallel branches, would not be sufficiently low, it would be convenient to use as an auxiliary device a motor-dynamo group connected across the terminals of the inductors connected together in series, the said group being then able to serve alternately for the shunting of the said inductors and for the reinforcement of the field according to the output of the dynamo.

However, the use of such auxiliary means for the reinforcement of the field is the less necessary the more considerable is the number of the motors of the grouping. The higher the number of parallel branches, the greater the current which flows through the inductor chain in series. If, therefore, starting from a connection in series or in series-parallel one passes to a higher voltage connection comprising a substantially larger number of branches, the field will be reinforced automatically and, therefore, the characteristic of the new connection will be lowered in a measure which will be a function of the increase of the number of parallel branches.

Thus the principles of the invention can be applied to any number of motors $n$, which for the lower voltage connection are grouped in $m$ parallel branches each comprising $u$ motors, and then are regrouped for the higher voltage connection in $p$ parallel branches each comprising $h$ motors, it being understood that $p$ is larger than $m$ and that $h$ is smaller than $u$. Such an arrangement is illustrated in Fig. 2, showing eight motors ($n=8$) adapted to be grouped in two parallel branches ($m=2$) each comprising four motors ($u=4$) or in four parallel branches ($p=4$) each comprising two motors ($h=2$). The first grouping is obtained by opening all of the switches $f$ and $d$ and closing all of the switches $e$. The second grouping is obtained by closing the switches $f$ and $d$ and opening the switches $e$. Each motor has a series field winding (indicated by primed letters) in its own branch, and a complementary field winding (indicated by double-primed letters) which is connected with the other complementary field windings in a chain which is in series with the group of motors as explained above. The current through the complementary chain is controlled by means of a shunting resistance R and a switch $o$.

With the motors operating according to the first grouping, when it is desired to effect the transition the driver brings the slide of the resistance R to the position of minimum resistance which provides maximum shunting of the complementary inductor windings of all $u$ motors in all $m$ branches (corresponding to curve $S_1$). In order to establish the desired conditions for obtaining the curve $P_1$ when the motors are regrouped, he then either opens the switch $o$ or, if sufficient, brings the slide of the resistance R to a suitable position. Immediately thereafter, by closing switches $d$ which may be controlled simultaneously, he short-circuits part of the motors in each of the $m$ parallel branches, and by opening switches $e$ and closing switches $f$, he groups these motors in additional branches to produce the second grouping mentioned above.

The transition to the upper connection is now effected, with maximum field reinforcement, and starting from the lowered curve of the upper connection thus obtained, it is possible to resume the regulation of the machine by closing the switch $o$ and/or varying the shunting through shifting the slide on the adjustable resistance R to suitable positions.

It will be observed that the means which serves for the regulation in the lower connection serves also for carrying out the immediate preparations for the transition proper and then for regulation in the upper connection.

It is not always necessary, in effecting the transition, to start from the maximum shunting curve of the lower connection, nor to lower to the maximum the curve of reinforced field of the upper connection. It is sufficient if, at the speed at the moment of the transition, there is a sufficient mutual intersection of a shunting curve of the lower connection and a curve of reinforced field of the upper connection. In other words: it is possible in certain cases to maintain a certain degree of shuntage through the transition from the lower to the upper connection, which can be effected by a single position of the slide on the resistance R.

Since the above transition in connections takes place with great rapidity, and since the intensity of current in the complementary windings increases practically instantaneously when the new connections are established, the mechanical parts are not subjected to harmful jerks and electrical surges in the motor armatures are reduced and need not be feared.

It may be pointed out in passing that the sudden variations of intensity and the superintensities to which the various armature or inductor windings of the motors are subjected offer no danger for the latter if care is taken to reinforce the wirings and the electrical connections.

Moreover it should be noted that it is not necessary to short-circuit the complementary windings of the $m$ ($u-h$) motors at the moment of the short-circuiting of the latter since their armatures are then inactive.

The transition from the upper to the lower connection is effected in a reverse manner, that is to say, by establishing conditions corresponding to the curve of reinforced field of the upper connection, then by disconnecting the motors in the additional branches ($p-m$) and reinserting them in their proper positions in the original $m$ branches.

In the above described examples, the complementary windings $l'' \ldots n''$ are combined in a chain connected in series with the group of parallel branches. However, separate excitation of the chain as described in the aforesaid copending application also permits the application of the invention with the same facility in either direction of transition.

In Fig. 3 the arrangement of the motors is the same as in Fig. 2, but the complementary chain is supplied by a dynamo G driven by a motor M which is energized by the same source as the motors. The regulation of the voltage at the terminals of the complementary chain, in order to obtain characteristics favourable to the transition, is insured by the exciting generator winding E connected in series with the parallel branches, controlled by a switch $k$ and regulated by an adjustable resistance $r$ connected in parallel with the terminals of the said winding.

As before, the transition from the lower to the upper connection is effected by first adjusting the resistance $r$ so as to reduce the current flowing through the winding E (the switch $k$ being closed) and, therefore, to diminish the current which flows through the complementary chain.

Thus the effect is similar to that obtained by shunting the complementary chain as in the previous examples. Of course, the maximum shunting curve (minimum current in $l'' \ldots n''$) will be obtained by opening the switch $k$ or by using the minimum value of the resistance $r$, but as noted above the use of the maximum curve is not always necessary.

Starting from this position of the characteristic it remains only to effect the operations which have been described above, namely: reinforcement of the complementary fields through the shifting of the slide of the resistance $r$ so as to increase the current in the winding E; short-circuiting of motors ($u-h$ in number) in each of the $m$ parallel branches; and the reconnection of these motors in additional parallel branches ($p-m$ in number) each comprising $h$ motors. Regulation in the upper connection thus obtained can be resumed by adjustment of the slide.

Of course, the return to the lower connection may be made by effecting the reverse operations.

In the case when owing to necessities of construction the regulation obtained by the resistance $r$ is insufficient to obtain a good intersection of the transition curves, it may be supplemented by suitable adjustment of the direction and amount of current in the supplementary generator winding $E_1$ provided for accessory workings of the locomotive (stabilisation, recuperation and the like).

In case the intensities flowing through the winding $E$ and resistance $r$ are too great, it may be desirable to reduce the size of these elements by connecting them with the terminals of a supplementary resistance $p$ (which also may be adjustable) connected in series with the parallel branches.

It is obvious that the invention is not limited to use with motors of the typical mechanical and electrical construction. Thus, the mode of transition which forms the subject matter of the invention is applicable to motors comprising in one and the same unitary frame a plurality of armatures and corresponding inductors, as far as it is possible to split up the said inductors and to couple the armatures. By extension, moreover, the same mode of transition is also applicable if, on one and the same collector, it is possible to pick up different voltages by means of suitable lines of brushes, in which case the couplings could be effected between the lines of brushes, on the one hand, and the inductors, on the other hand.

In a like manner, the method can be applied if one and the same motor comprises with a single armature a plurality of collectors each of which possesses lines of brushes for the various windings, it being then possible to make the groupings between the lines of brushes corresponding to a series of windings in the series, series-parallel and possibly parallel form. Then these various groupings would form the various series-parallel branches which have been contemplated above, which series-parallel branches would comprise in each series-branch the corresponding fractions of inductor windings and would deliver current through their connection in series-parallel or parallel to the single chain comprising all the complementary fractions of the elementary machines.

If one considers that the progression or the regression of the foundamental curve of the above contemplated motor unit can be obtained, for instance, by the rotation of the lines of brushes, it may be desirable to apply the method in order to insure the passage from a brush position corresponding to the maximum curve of the lower connection to the shifted position corresponding to the minimum curve of an upper connection.

For this purpose, the regulation which in the preceding examples was obtained by acting on the complementary chain can be obtained in the contemplated case by suitable shiftings of the brushes. To this regulation by shifting can be added, moreover, the regulation on the complementary chain as described above.

From the preceding it will be seen that the regulation in view of the transition is obtained in most cases and in the most convenient manner through the regulation of the complementary inductor chain. It can be advantageous, however, in certain cases, to effect this regulation and to obtain more particularly a high shunting curve for the lower connection by short-circuiting in each branch all or part of the windings which are constantly connected with the elementary motors. It is obvious that the effect which will be obtained will be a raising of the curve if one diminishes the working winding fraction or the intensity of the current which flows through the latter. A reverse control will insure the desired lowering in the case of the upper connection.

Of course, this does not exclude the concomitant or subsequent working of the regulation of the complementary chain or any other adequate regulation.

In the case shown in Figure 9 of the co-pending application referred to above, where the armatures alone accompanied by their respective changing over windings appear in the parallel branches, while the totality of the inductors forms a single chain arranged in the like manner as was the complementary chain in the other embodiments (connected or separated), the above described mode of transition is applicable, of course, without any difficulty.

*Transition or recuperation.*—In all that precedes one has simply contemplated the transition back and forth between two connections. The same system is integrally applicable for the transition back and forth when running with recuperation. For this purpose, it is sufficient that the whole of the diagram provided for the recuperation, i. e., the diagram comprising the exciting means for the single inductor chain as desired in order that the armatures work as dynamos, permits for a given speed the intersection of a low curve of the upper connection with a high curve of the lower connection (more particularly with the use of a winding such as $E_1$, Fig. 3).

In recuperation, indeed, the most interesting transition is that which permits the passage from an upper to a lower connection.

I claim:

1. The method of shifting a plurality of series wound motors from a series to a parallel connection, said motors being connected to a source of constant voltage, which comprises shunting at least part of each motor field by resistance, shifting armatures from series to parallel while still maintaining at least a part of each field in series circuit relationship with one another, opening the shunt and gradually introducing resistance in shunt to said series circuit.

2. The method of shifting a plurality of series wound motors from a series to a parallel connection, said motors being connected to a source of constant voltage, which comprises shunting part of each motor field by resistance, shifting armatures from series to parallel while still maintaining a part of each field in series circuit relationship with one another, opening the shunt and gradually introducing resistance in shunt to said series circuit.

3. A method of transition between two forms of connections for a group of direct current motors comprising respectively a connection of relatively low terminal voltage for said motors and a connection of relatively high terminal voltage for said motors, said motors all having at least a part of their field windings connected in series with one another in the same field circuit, said method comprising the steps of first reducing the current in said field circuit with said motors in the lower voltage connection, whereby the speed-torque characteristic curve of said group of motors is raised, and then shifting said motors to said connection of higher voltage while increasing the current in said field circuit, whereby the speed-torque characteristic curve of said group of motors is lowered, the field circuit current being proportioned to bring said raised and lowered curves into proximity at a certain motor speed whereby said motors may be shifted directly from one connection to the other at approximately said speed without substantial changes in torque.

4. A method as defined in claim 3, wherein said field circuit current is regulated by adjustably shunting said circuit and adjusting the shunt to reduce said current in the lower connection and to increase said current in the upper connection.

5. A method of transition between two forms of connections for a group of direct current motors comprising respectively a connection of relatively low terminal voltage for said motors and a connection of relatively high terminal voltage for said motors, said motors all having at least a part of their field windings connected in series with one another in a field circuit traversed by an exciting current proportional to the total of the armature currents of all of said motors, said method comprising the steps of first reducing the current in said field circuit substantially below its normal value proportional to said total armature current for said lower voltage connection while maintaining said motors in said lower voltage connection, then shifting said motors to said higher voltage connection thereby increasing the current in said field circuit to a value substantially above said normal value, and thereafter again reducing the current in said field circuit while maintaining said motors in said higher voltage connection.

PAUL MARIE JACQUES
SÉVERIN DE GIACOMONI.